(12) United States Patent
Schillab et al.

(10) Patent No.: US 8,670,110 B2
(45) Date of Patent: Mar. 11, 2014

(54) ARRAY CONNECTOR TEST HARNESS FOR SINGLE-ENDED OPTICAL TEST INSTRUMENTS

(75) Inventors: Christian Schillab, Moedling (AT); Harlan Kassler, Austin, TX (US); J. David Schell, Austin, TX (US)

(73) Assignee: Fluke Corporation, Everett, WA (US)

( * ) Notice: Subject to any disclaimer, the term of this patent is extended or adjusted under 35 U.S.C. 154(b) by 7 days.

(21) Appl. No.: 13/466,177

(22) Filed: May 8, 2012

(65) Prior Publication Data

US 2013/0301036 A1 Nov. 14, 2013

(51) Int. Cl.
*G01N 21/00* (2006.01)
(52) U.S. Cl.
USPC .......................................................... 356/73.1
(58) Field of Classification Search
USPC .......................................................... 356/73.1
See application file for complete search history.

(56) References Cited

U.S. PATENT DOCUMENTS

| | | | | |
|---|---|---|---|---|
| 6,369,883 | B1 * | 4/2002 | Clark | 356/73.1 |
| 2006/0233506 | A1 * | 10/2006 | Noonan et al. | 385/134 |
| 2006/0257092 | A1 * | 11/2006 | Lu et al. | 385/134 |
| 2009/0214163 | A1 * | 8/2009 | Lu | 385/71 |

* cited by examiner

*Primary Examiner* — Tu Nguyen
(74) *Attorney, Agent, or Firm* — Edwards Wildman Palmer LLP; Scott D. Wofsy; Christopher J. Capelli

(57) ABSTRACT

A system, apparatus and method for testing optical fiber systems by providing a near-end and far-end harness that loops the set of fibers in the fiber system together. The near-end harness has an interface to connect to the tester. The tester then effects testing on the entire set of fibers, which are looped together by the configuration of the two harnesses creating a single optical path that traverses the entire set or subset of fibers in the network, so a launched test signal propagates through the entire set of looped fibers, providing measurement results for the fibers.

24 Claims, 4 Drawing Sheets

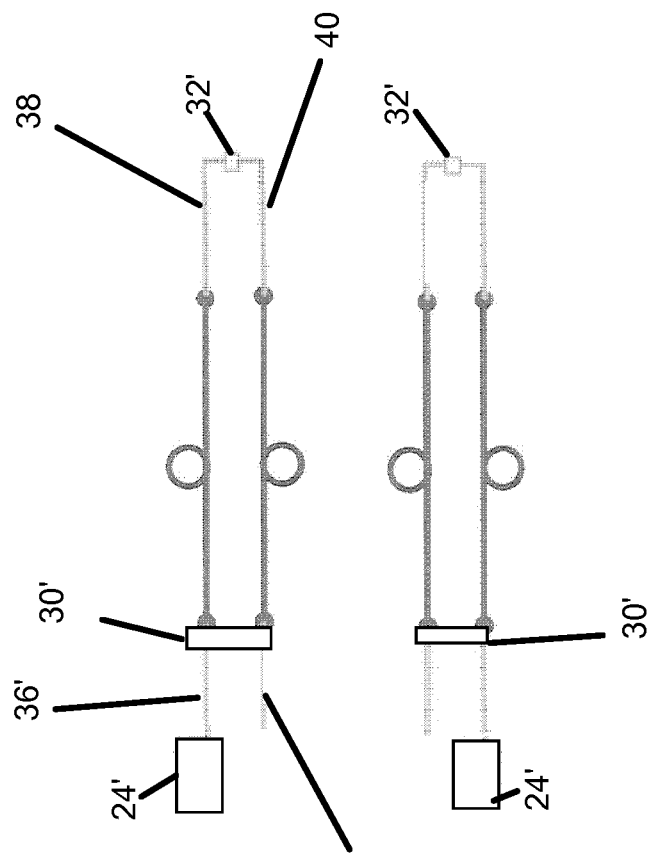

ARRAY CONNECTOR TEST HARNESS FOR SINGLE-ENDED OPTICAL TEST INSTRUMENTS

BACKGROUND OF THE INVENTION

This invention relates to optical test instruments, and more particularly to array connector test harnesses for single-ended optical test instruments.

Array connectors, such as MPO/MTP® connectors (MPO is an industry acronym for multi-fiber push on connectors, MTP® is a brand of MPO connector), contain multiple fibers aligned in an array. Most common is 1×12 but 2×12 and other configurations are available. However, test instruments are designed to interface to single fiber connectors. These single fiber connectors are sometimes aggregated into a duplex link and some test instruments are designed to interface to these. No test instruments are configured to interface to array connectors.

To accommodate this lack of interface to array connectors, prior art requires a custom harness that breaks-out the array connector interface to simplex connectors, see FIG. 1. The tester may then be connected to the first simplex connector and the first fiber tested. The tester then must be disconnected and subsequently connected to the next and subsequent connectors to test the next and subsequent fibers in the array. Ideally, the length of fiber in the break-out harness is long enough to suppress the effects of the tester's deadzone (the length during which reflections return too quickly after the stimulus to be detected by the tester).

The harness comprises launch-cord end and tail-cord end harnesses 12, 14, which connect to respective array connectors 16, 16', the array connectors interfacing with the fiber network under test 18. It is noted that the fiber network comprises plural fibers with ones of the fibers corresponding to ones of the connections of the array connector. The near-end harness 12 comprises plural launch cord connection fibers 20, 20', 20", etc., with interface connectors 22, 22', etc. adapted for connection to a test instrument 24. Tail-cord breakout harness 14 has a corresponding set of breakout fibers 26, 26', etc. with connectors 28, 28', etc. for connection to a test instrument.

FIG. 2 illustrates the testing steps involved with testing in accordance with the prior art. To accomplish a testing of a fiber link, at step 1, a first fiber of the set of fibers is selected and the launch-cord breakout connector 20 (for example) of that fiber is connected to the test instrument, the tail-cord breakout connector 26 is connected at the far end of the fiber, and a testing sequence is performed. Next, the test instrument is connected to a different launch-cord breakout fiber 20' with the tail-cord breakout connector 26' connected to the far end of the fiber (step 2), and a testing sequence is performed. Subsequent launch-cord breakout fibers 20", 20''', 26", 26''', etc. are connected and testing performed, until the full set of fibers (or a desired subset) has been tested.

Next, the test instrument is moved to the far end of the fiber network, the tail-cord and launch-cord breakout fiber connectors are moved to the opposite end of the fiber, with tail-cord breakout fiber 26 connected to the remote end and launch-cord breakout fiber 20 connected at the near end (which formerly was the remote end), whereupon a test sequence is initiated, step 3. Once that testing is complete, the test instrument is connected to a different launch-cord breakout fiber 20' and tail-cord breakout fiber 26' (step 4) and a testing sequence is performed. Subsequent tail-cord/launch-cord breakout fibers 20"/26", 20'''/26''', etc. are connected and testing performed, until again the full set of fibers (or a desired subset) has been tested.

The above steps effect full bi-directional testing of the fiber network, but require careful monitoring of the testing sequences and steps to ensure that all the fibers are appropriately tested. Also, the testing steps, including requiring moving the test instrument to opposite ends of the network, can be time consuming.

SUMMARY OF THE INVENTION

In accordance with the invention, an optical harness system provides a near-end and far-end harness that loops the set of fibers together. The near-end harness has an interface to connect to the tester. The tester then effects testing on the entire set of fibers, which are looped together by the configuration of the two harnesses creating a single optical path that traverses the entire set or subset of fibers in the network, so a launched test signal propagates through the entire set of looped fibers, software analysis recognizes the harnesses and removes them so that the fibers under test are parsed out and separately analyzed and displayed, providing measurement results for the fibers.

Accordingly, it is an object of the present invention to provide an improved system, method and apparatus for testing fiber systems.

It is a further object of the present invention to provide an improved test harness system for use in testing fiber systems employing array connectors.

It is yet another object of the present invention to provide an improved method for testing fiber systems that are interfaced with array connectors.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 4 is an illustration of the testing method, in accordance with the present disclosure.

DETAILED DESCRIPTION

The system according to a preferred embodiment of the present invention comprises a near-end and far end harness, wherein the two harnesses provide a loop connection for the fibers thereby connected, providing a single optical path that may be then tested. The near-end connector provides two pig-tail connection fibers for attachment of the respective ends of the single optical path to a test instrument, allowing bi-directional testing of the fiber network.

The optical fiber harness allows a single fiber test instrument (such as an OTDR) to interface to an array connector and test all fibers in the connector's link at once without having to move or relocate the single interface. It also provides a method to interface to the more prevalent duplex link. The duplex link interface also reduces test time by allowing bidirectional averaging without having to transport the tester to the opposite end of the link. The possible increase in labor savings due to test time reduction can be significant.

Figure 1:
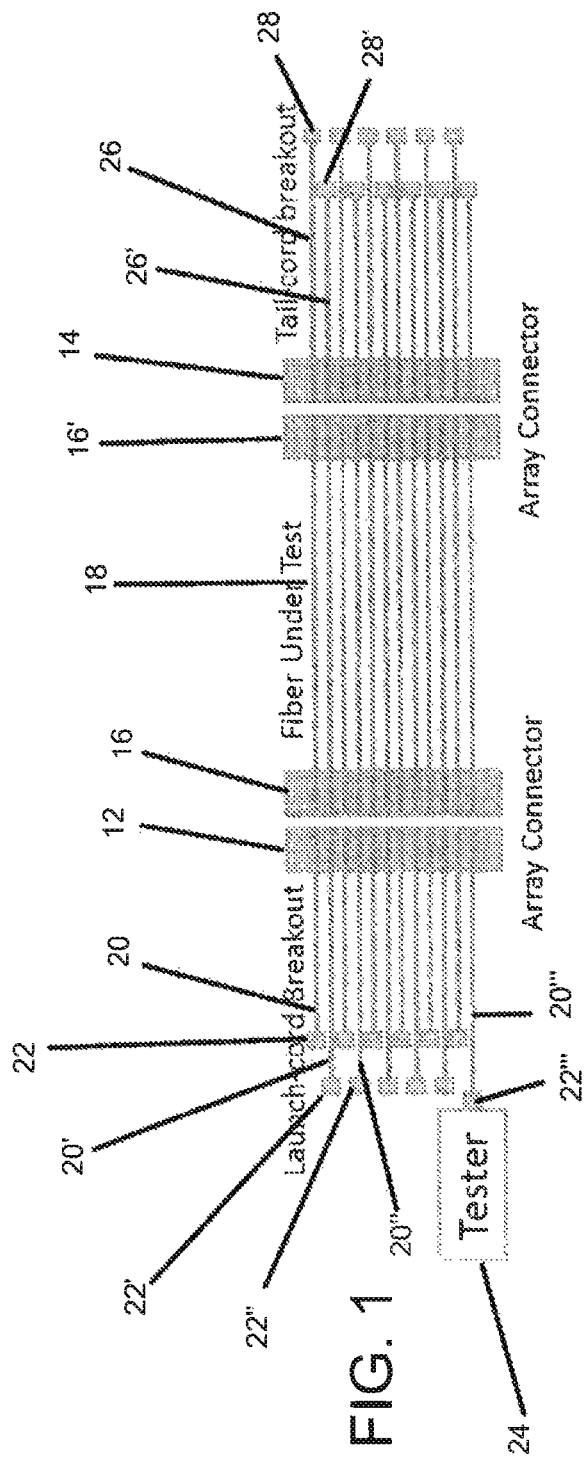
FIG. 1 is a schematic diagram of a test configuration for fiber systems using array connectors, in accordance with the prior art.
Figure 2:
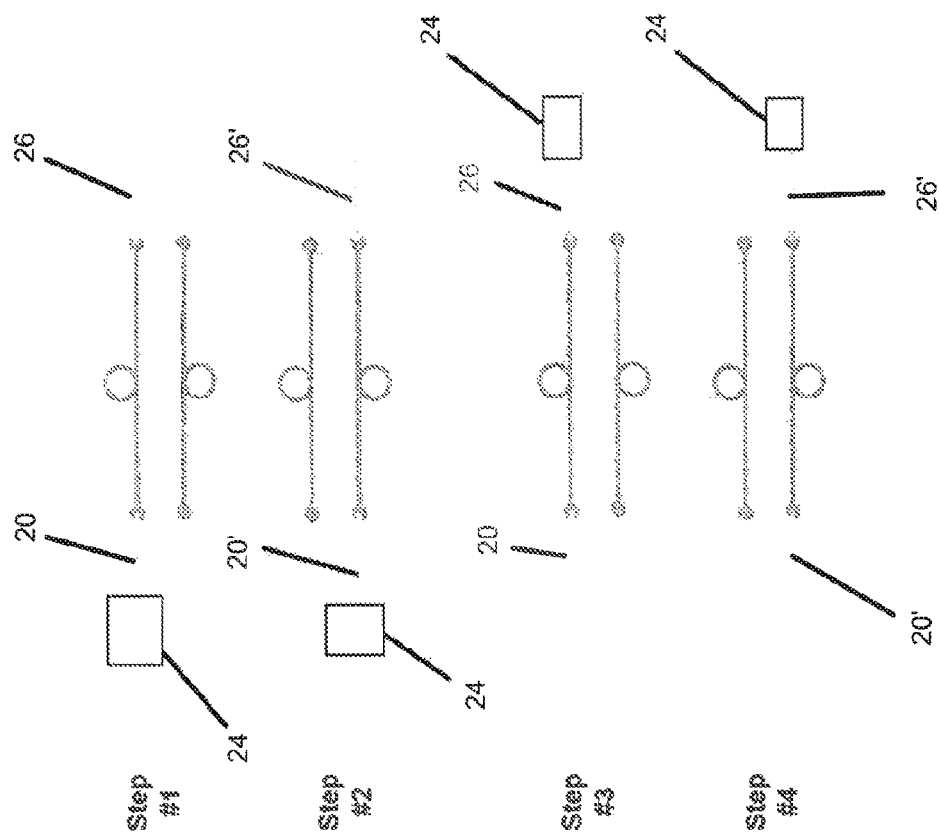
FIG. 2 is an illustration of the testing method, in accordance with the prior art, of fiber networks employing array connectors.
Figure 3:
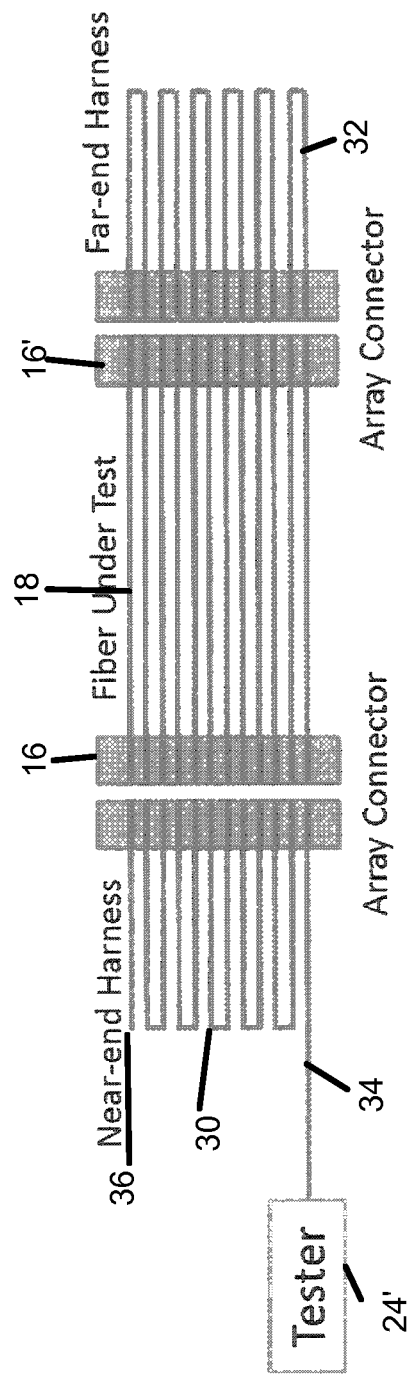
FIG. 3 is a schematic diagram of a test configuration for fiber systems using the array connector test harness in accordance with the present disclosure.

The system comprises two optical harnesses, see FIG. 3. The first, near-end harness 30, connects to the array connector on the near-end, the second, far-end harness 32, connects to the array connector on the far-end. The near-end harness contains a lead-in fiber 34 that connects the test instrument 24 (which includes hardware to effect testing, including ram, rom, one or more cpus, optical signal generators and receiving devices, user interfaces, computer/communications interfaces, etc.) to the first fiber in the array. It also contains loopback fibers that connect fibers 2 to 3, 4 to 5, 6 to 7, etc., continuing the pattern to the last fiber. Assuming an array with an even number of fibers the last fiber will not have a loopback but will have a length of fiber acting as a tail-cord 36. The far-end harness 32 contains loopback fibers that connect fibers 1 to 2, 3 to 4, 5 to 6, etc., continuing the pattern to the last fiber. Each fiber in both harnesses should be long enough to suppress the tester's deadzone, allowing each fiber's connector interface to be measured.

In use, a typical single-ended test instrument will send an optical pulse out of its test port into the lead-in fiber. The pulse will travel down fiber 1, loopback into fiber 2, loopback into fiber 3, continuing on until the end of the tail-cord is reached. The backscatter and reflections of all events and fiber are propagated into the reverse direction back into the tester's test port. Thus all fibers in the array are tested with a single test instantiation.

In a particular embodiment of this system, software is included within the tester and/or a computer software application that analyzes the measurement data to separate the fibers under test from the fibers within the test harnesses. Thus, automated measurement analysis is conducted and simplistic, illustrative graphics may be utilized to simplify the visual representation of the fibers under test.

The loopbacks within both the near-end and far-end harnesses may be constructed in such a way as to render each uniquely identifiable. This may assist in the software analysis in cases where the fiber under test contains impairments rendering the analysis difficult or impossible without the assistance of uniquely identifiable loopbacks. The method of rendering the loopbacks uniquely identifiable may take many different forms. One form may be to make the length of each loopback unique. Another form may be to add an event, such as non-reflective loss, at a unique location within the loopback. Another form may be to add multiple events and unique locations within the loopback. Multiple events may be used as a binary code to uniquely identify each loopback. Or any combination of these forms mentioned and many others not mentioned may be utilized.

The unique identification allows the virtual subtraction of the loopback fibers so that the software or user may measure the fiber characteristics. It also allows polarity testing.

The harness may be packaged into a robust, easy to use, mechanical package that protects all the loopback fiber and provides a sheathed cable to protect the fibers interfacing to the connector.

Note that this system and method may also be useful on single fiber connectors configured as duplex fiber links, in addition to other multi-fiber connector systems. Most of today's fiber links are configured as duplex links with single fiber connectors. This system and method allows a great improvement in test time by allowing a bidirectional test and averaging without the requirement to physically move the tester to the opposite end of the fiber. As illustrated in FIG. 4, with the array connector test harness in accordance with the disclosure, the method of testing is as follows. First, the near-end harness 30 is connected at one end of the fiber network, while the far-end harness 32 is connected at the opposite end, forming a loopback across the fibers. Next, the test instrument is connected to lead-in fiber 34, and testing is performed. For bi-directional testing, next the test instrument is connected to tail-cord 36 (or if the number of fibers is an odd number, connection is otherwise made to the last fiber in the loop) and further testing is performed.

A more extensive explanation of testing is as follows: First, the near-end launch-cord end harness 30 and far-end tail-cord end loopback harness 32 together, but without a fiber under test to identify loopback fiber lengths and any events within the loopbacks, used to uniquely identify each one. This step can employ a jumper cable to mate the two ends of the loopback harnesses together, if the MPO connectors are polarized in such a way that they do not physically mate. Each of the fibers in this jumper cable should suitably be chosen to be very close to the same length to each other (within 0.5 meters). For a duplex fiber embodiment, the near-end harness may be implemented as a breakout of the two fibers into a launch and tail cord.

Next, existing analysis software can be used to identify the events over the entire length. Each loopback segment is expected to be at least a minimum length that is beyond the deadzone of the tester. The jumper cable may be shorter than this, which can be preferred to distinguish these segments from the loopback fibers. Alternatively, the jumper cable may be longer than the longest loopback segment. If the length of each loopback segment is unique and has no internal events, then the median length of all segments longer than the minimum length can provide an estimate of the typical loopback segment length. The number of segments found should be approximately the total length (minus any jumper cables and minus the first launch segment) divided by the median length. Or the number can be a value that the user provides. If the longest loopback lengths is built so it is less than double the shortest loopback length, this can help identify situations where a connection were missed thus far in the referencing step.

If each loopback has a non-reflective event, unique in location and/or loss, and the fiber segment on either side of the event is longer than the minimum length needed for the deadzone of the tester, then twice the median length should indicate the typical length of a loopback. The loss for each loopback segment can even be made adjustable by mechanically bending the fiber. Combined with a real-time trace, adjusting the loss would visibly show where the loopback fiber was located within the total fiber span to help with correcting cross-connect issues. However, this could impact launch conditions for multimode fibers.

If the binary encoding form is used, where spaced events are provided to generate a binary identifying code of events, then each loopback segment could be identified by a series of relatively closely spaced events surrounded by segments at least as long as the minimum length. Other non-binary encoding can be used.

Further alternatively, the user could also enter the lengths of each loopback manually.

Another approach is to calibrate the loopback harnesses during manufacturing and provide the length and identifying event information with the harnesses that could be entered into the instrument, either manually or by encoding information provided by the harness to the instrument on connection or setup inquiry from the instrument.

Still further, all loopback harnesses can be manufactured so that the tolerance of the lengths of each loopback fiber is less than the difference between the lengths of each loopback, and this information recorded in the tester, so the lengths of each loopback must match a narrow range to help identify each unique loopback segment. For each event, an algorithm can check that the following event/s match the expected pattern within tolerance. Both forward and reverse direction of the pattern can be checked, since either end of the near-end harness could be connected.

The testing operation continues as follows:

The fiber under test for MPO and duplex ribbon cable should measure nearly the same length on each segment. This information can help identify the segments, though is not an absolutely necessary condition.

Existing analysis software can be used to identify the events over the entire length.

The total length minus the launch, tail and loopback can be divided by the number of MPO fibers expected to give the typical length of the fiber under test.

After locating the event at the launch, then adding the typical fiber under test length, then the events within the measurement tolerance at this position along the measured signal can be compared to each of the expected loopbacks (since it is possible for some of the fibers to be cross-connected). This matching can be repeated for each length.

In a particular use configuration, for example, employing different lengths to assist in distinguishing fibers, lead in fiber 34' may include a 90 meter launch fiber, while tail cord 36' may include a 110 meter launch fiber. Far end harness 32' may include 90 meter fiber 38 and 110 meter fiber 40.

In accordance with the disclosure herein, an improved method, apparatus and system is provided for providing an array connector harness for optical network testing. The system, method and apparatus provide easier, quicker testing of multi-fiber network connections. Additionally, it allows polarity testing and identification.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An array connector harness system for optical network testing, comprising:
    a near-end harness for connection to a fiber under test at a first end thereof; and
    a far-end harness for connection to the fiber under test at a second end thereof,
    wherein said near-end and far-end harnesses cooperate to connect said fiber under test to form a single optical path from end to end wherein said fiber under test comprises plural fiber paths and each of said near-end harness and far-end harness comprises a loop-back-interface to interconnect ones of said plural fibers.

2. The array connector harness system according to claim 1, wherein said near-end harness comprises an array connector.

3. The array connector harness system according to claim 1, wherein said near-end harness comprises an MTP connector.

4. The array connector harness system according to claim 1, wherein said far-end harness comprises an MPO connector.

5. The array connector harness system according to claim 1, wherein said far-end harness comprises an MTP connector.

6. The array connector harness system according to claim 1 wherein said loop-back-interface comprising unique lengths for ones of loopbacks of said plural fibers.

7. The array connector harness system according to claim 1 wherein said loop-back-interface comprising non-reflective loss elements at unique locations within the loop-back.

8. The array connector harness system according to claim 1 wherein said loop-back-interface comprising multiple events used as a code to uniquely identify each loopback.

9. A method of testing a multi-fiber optical link, comprising:
    interconnecting plural ones of individual fibers of said multi-fiber link to form a single optical path;
    performing testing on said single optical path wherein said interconnecting comprises providing a first loop-back connector on a first end of said fiber link and a corresponding second loop-back connector at a second end of said fiber link, said first and second loop-back connectors cooperating to interlink ones of the individual fibers of said multi-fiber optical link to form a single optical path therethrough.

10. A fiber optic test system comprising:
    a test instrument;
    a near-end harness for connection to a fiber under test at a first end thereof; and
    a far-end harness for connection to the fiber under test at a second end thereof,
    wherein said near-end and far-end harnesses cooperate to connect said fiber under test to form a single optical path from end to end for connection to said test instrument to effect testing of the fiber under test wherein said fiber under test comprises plural fiber paths and each of said near-end harness and far-end harnesses comprises a loop-back-interface to interconnect ones of said plural fibers.

11. The fiber optic test system according to claim 10, wherein said near-end harness comprises an MPO connector.

12. The fiber optic test system according to claim 10, wherein said near-end harness comprises an MTP connector.

13. The fiber optic test system according to claim 10, wherein said far-end harness comprises an MPO connector, 14. The fiber optic test system according to claim 10, wherein said far-end harness comprises an MTP connector.

15. A method of testing a multi-fiber optical link, comprising:
    providing a first loopback interface at one end of the multi-fiber optical link to form a loop connection of plural ones of individual fibers of said multi-fiber optical link;
    providing a second loopback interface at the other end of the multi-fiber optical link, interconnecting plural ones of individual fibers of said multi-fiber link together with said first loopback interface, to form a single optical path through said plural ones of individual fibers and providing two tail connections for access to both ends of said single optical path; and
    performing testing on said single optical path.

16. The method according to claim 15, wherein said multi-fiber optical length comprises a duplex fiber path.

17. The method according to claim 15, wherein said testing comprises a calibration operation, said calibration operation comprising:
    connecting the first and second loopback interfaces together in absence of a fiber under test to identify loopback fiber lengths and events within the loopbacks used to uniquely identify each one; and analyzing test results to identify the events over the entire length.

18. The method according to claim 17, comprising employing the median length of all segments longer than the minimum length to provide an estimate of the typical loopback segment length.

19. The method according to claim 15, comprising providing each loopback with a unique non-reflective event to enable identification under test of each individual loopback.

20. The method according to claim 19, comprising adjusting a loss value for each loopback segment by mechanically bending the fiber to provide indication of where the loopback fiber is located within the total fiber span to help with correcting cross-connect issues.

21. The method according to claim 15, wherein each loopback interface comprises plural loopback fibers, and comprising employing a user provided value of lengths of each fiber of the loopback interfaces for unique identification thereof.

22. The method according to claim 15, wherein each loopback interface comprises plural loopback fibers, and comprising employing a user provided value of lengths of each loopback fiber of the loopback interfaces.

23. The method according to claim 15, wherein said testing comprises identifying detected events over the entire length of the looped fiber segments.

24. The method according to claim 15 wherein said testing comprises dividing a length measurement value by a number of fibers to give the typical length of the fiber under test

* * * * *